United States Patent [19]
Lee

[11] Patent Number: 4,694,390
[45] Date of Patent: Sep. 15, 1987

[54] MICROPROCESSOR-BASED CONTROL AND DIAGNOSTIC SYSTEM FOR MOTOR OPERATED VALVES

[75] Inventor: Robert A. S. Lee, Tewksbury, Mass.

[73] Assignee: Electric Power Research Institute, Inc., Palo Alto, Calif.

[21] Appl. No.: 750,617

[22] Filed: Jun. 28, 1985

[51] Int. Cl.[4] .................. G05B 13/02; F16K 31/02
[52] U.S. Cl. ........................ 364/165; 137/487.5; 137/554; 251/129.01; 364/167; 364/510
[58] Field of Search ............ 364/130, 164, 165, 167, 364/152, 509, 510, 184–187; 251/129.01, 129.05, 129.11, 129.12, 129.13; 137/487.5, 551, 554, 596.17, 625.65; 318/286, 466–470

[56] References Cited

U.S. PATENT DOCUMENTS

| | | | |
|---|---|---|---|
| 3,343,409 | 9/1967 | Gibbs | 73/151 |
| 4,345,612 | 8/1982 | Koni et al. | 137/554 X |
| 4,364,111 | 12/1982 | Jocz | 364/510 X |
| 4,406,122 | 9/1983 | McDuffie | 417/399 X |
| 4,455,012 | 6/1984 | Gupta | 251/129.05 |
| 4,523,286 | 6/1985 | Koga et al. | 137/554 X |
| 4,562,531 | 12/1985 | Enterline et al. | 364/164 |

*Primary Examiner*—Joseph Ruggiero
*Attorney, Agent, or Firm*—Flehr, Hohbach, Test, Albritton & Herbert

[57] ABSTRACT

There is described a microprocessor-based valve motor control system which provides control, predictive control and diagnostic functions for a motor operated valve. A valve stem position sensor measures the stem position and a load sensor measures the load on the valve stem.

When the valve is being opened, the system predicts the position of the valve stem at a predefined time in the future and turns off the motor if the predicted valve stem position is beyond a preselected open valve position. When said valve is being closed, the system predicts the load on the valve stem at a predefined time in the future and turns off the motor if the predicted load value exceeds a preselected maximum desirable stem closing load.

22 Claims, 9 Drawing Figures

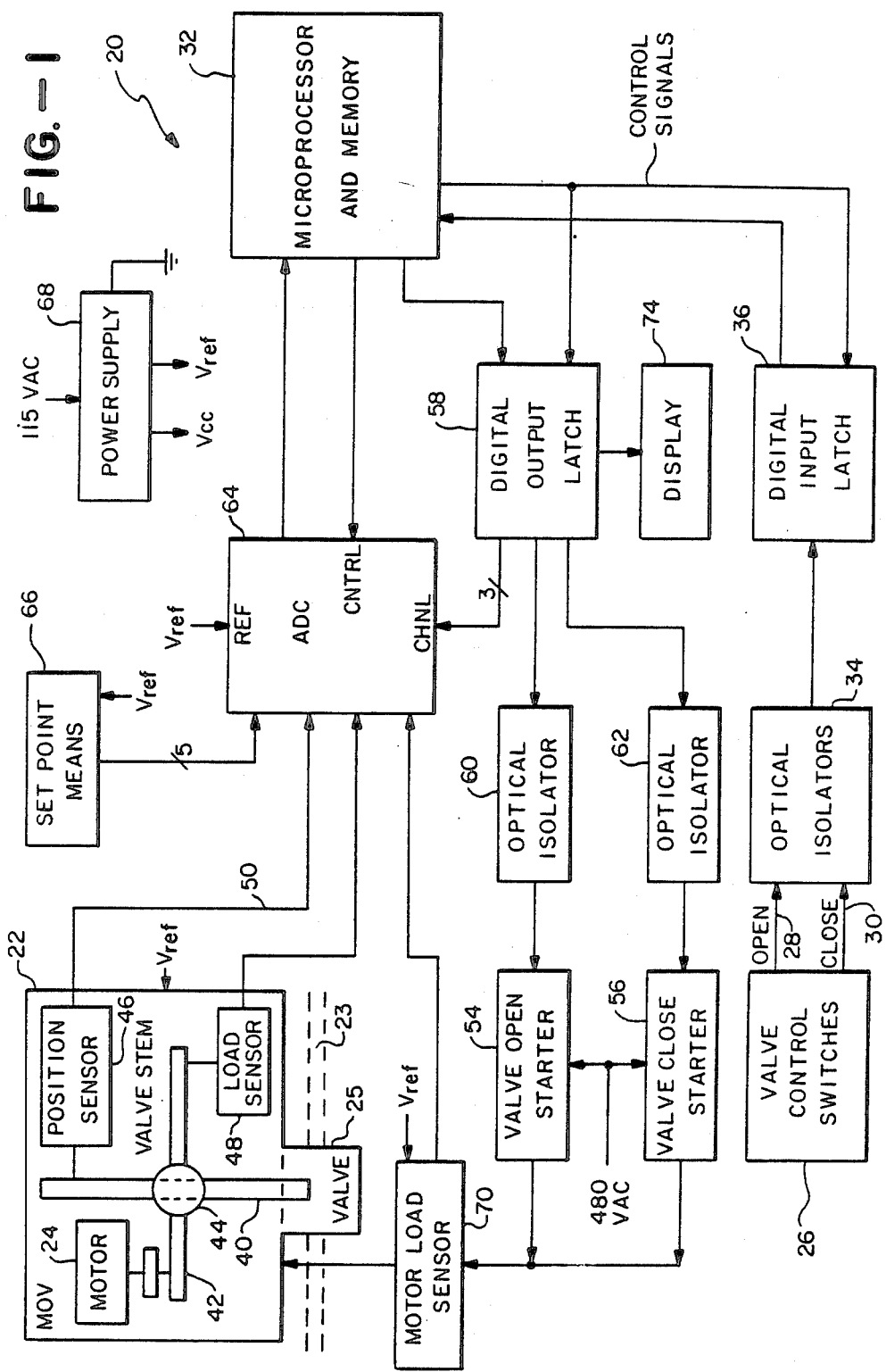
FIG.—1

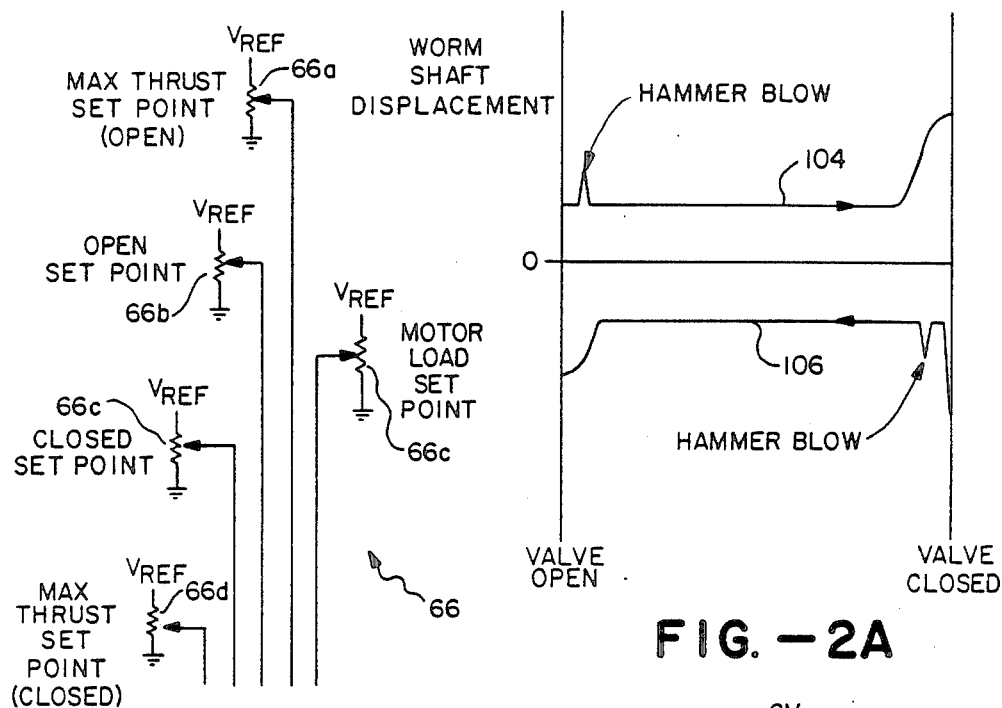
FIG.–1A
FIG.–2A
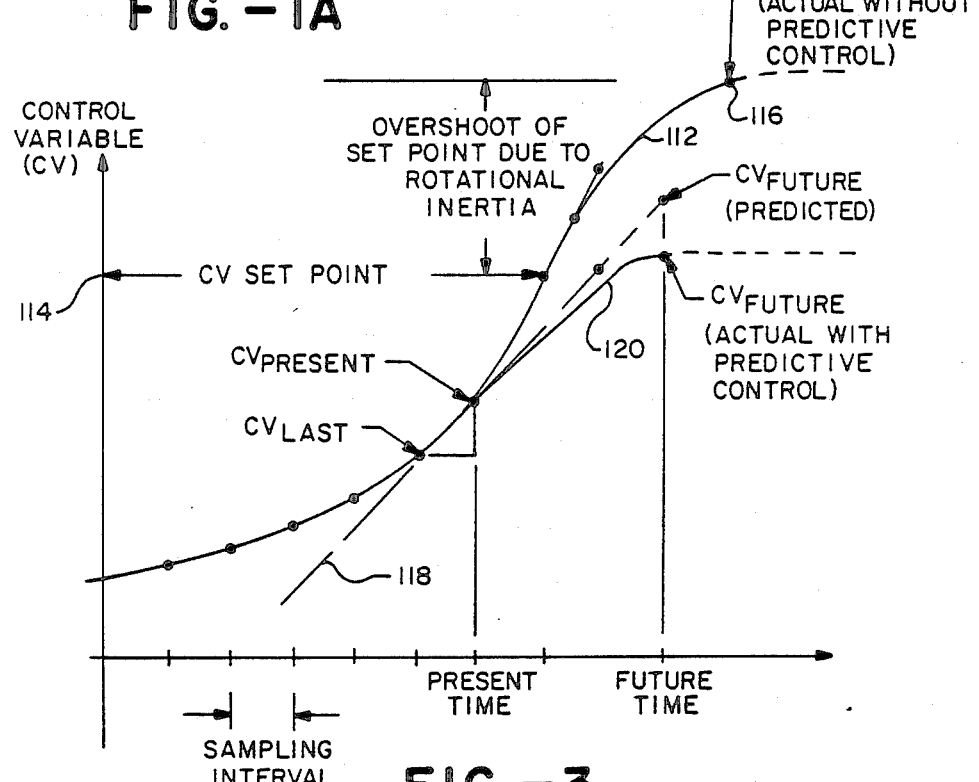
FIG.–3

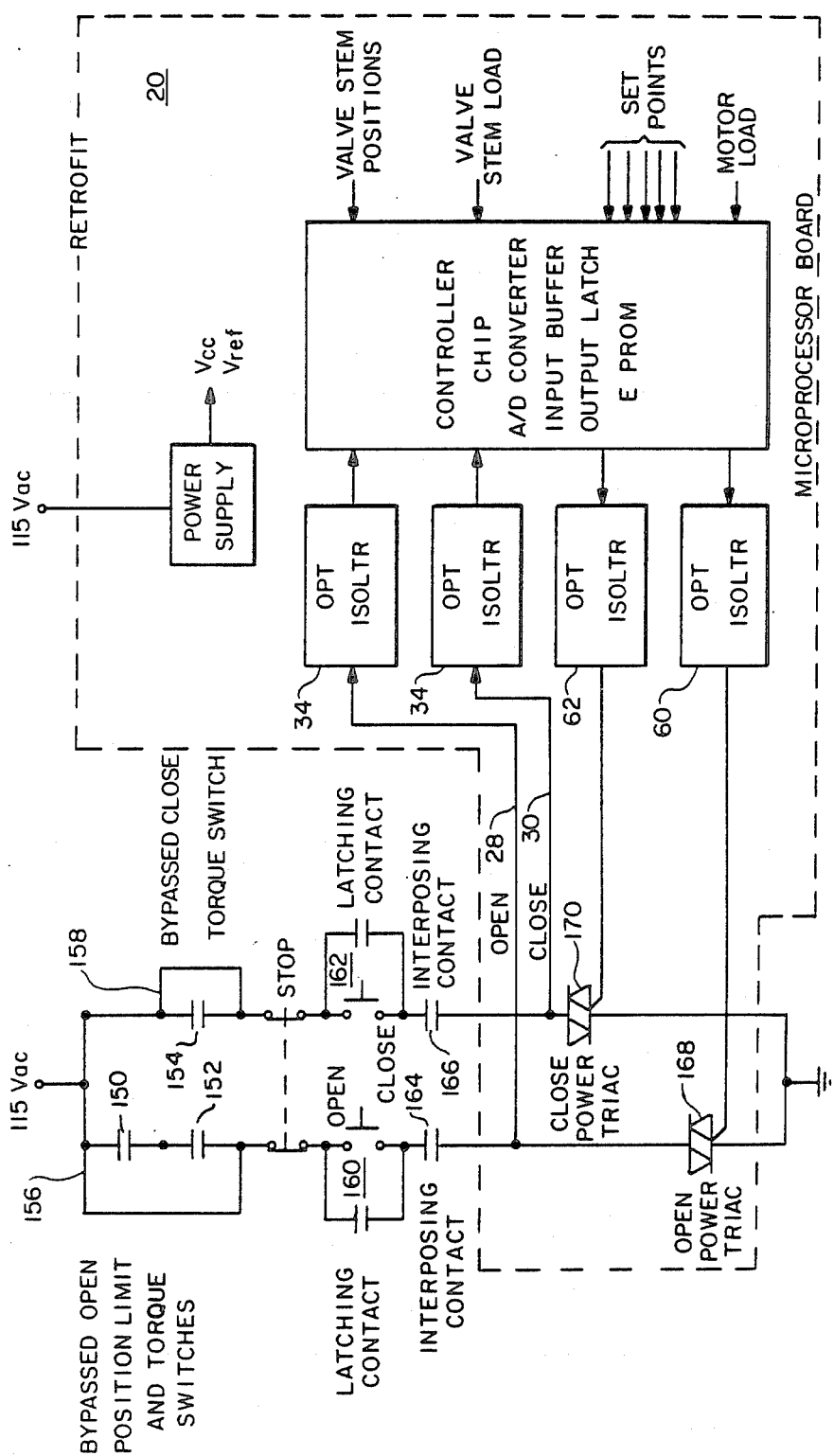
FIG.—7

MICROPROCESSOR-BASED CONTROL AND DIAGNOSTIC SYSTEM FOR MOTOR OPERATED VALVES

The present invention relates generally to an improved control system for motor operated valves, and particularly to a microprocessor based control and diagnostic system for motor operated valves.

BACKGROUND OF THE INVENTION

Historically, motor operated valves have been employed in applications where factors such as line size, high pressure, temperature, flow rate, or inaccessible location dictates that other types of valve operators will not suffice. In nuclear power facilities, the additional concerns of radiological exposures, fast emergency system operation, and the required ability to bring the plant to a safe shutdown condition underscore the critical role of properly functioning motor operated valves (MOVs).

In recent years, the issue of MOV reliability has become the subject of increasing concern, particularly in the nuclear power industry. Hundreds of MOV failures have been investigated in different studies.

In one study, Assessment of Motor Operated Valve Failures, INPO-83-037, Institute of Nuclear Power Operations, Atlanta, Ga. (October, 1983), electromechanical torque switches and limit switches were identified as the components at the root of approximately 32 percent of the documented MOV failures. Mechanical failures (failure to operate, bent stems, damage to valve seats, gear binding and damage) accounted for 22 percent of the MOV failures analyzed in the INPO report. Thus 54 percent of the MOV failures were attributable to electromechanical components within the actuator itself.

As a result, it is clear that the electromechanical components within the motor actuator are in need of improvements. A related problem is the difficulty in accurately setting up the torque and limit switch set points. In particular, prior art torque switches typically have set screws for setting the torque limit points without any accurate mechanism for correlating the set screw position to a specified amount of valve stem load.

In addition to their unreliablity, a problem with limit switches on prior art valve motor operators (VMOs) is that they normally provide no information as to to position of the valve stem in mid-stroke. Thus it is impossible to ascertain, for example, if the set point is going to be attained momentarily, or if a set point is being approached more rapidly than normal (e.g., because of an overvoltage condition) or more slowly than normal (e.g., because of increased stem packing friction or gear train binding).

Another shortcoming of prior art valve motor operators is the accuracy of thermal overload protection that is typically provided in VMOs. A snap action bimetallic switch is exposed to an electrical resistance heater through which motor winding current flows. If the motor current increases inordinately, and for a sufficient period of time, the heat from the resistance heater causes the bimetallic switch to open, thereby opening the motor starter coil and shutting down the motor. This method of detecting motor overload is indirect and unreliable. A direct measurement of motor load is much preferable because this would be more consistent with typical motor specifications which include limitations on the length of time that the motor can withstand different overcurrent conditions.

The present invention overcomes many of the shortcomings of prior art valve motor operators. Limit switches are replaced by measurements of actual valve stem position. Torque limit switches are replaced by measurements of valve stem load. Snap action bimetallic switches for motor thermal overload protection are replaced with measurements of actual motor load. All of these measurements are periodically compared by a microprocessor with corresponding set points at least fifty times per second.

A significant feature of the present invention is that it can use successive valve stem position measurements and valve load measurements to predict the valve stem position and valve stem load at a specified time in the future. Using this capability, the control system of the present invention takes the inertia of the system into account by turning off the motor when the predicted future value of either the valve stem position and/or the valve load at a specified time in the future (e.g., 0.20 seconds in the future) exceeds the corresponding set point. Thus motor cutoff can be initiated before the valve reaches or exceeds a set point. This has been found to greatly reduce overshoot problems, caused by rotational inertia, which put unnecessary stress on the valve and can cause valve failure.

Another benefit of the present invention is that tailoring of the control system to various applications is much simpler than with prior art systems because most adjustments require only the change of parameter values in the control software, or modification of the software, rather than the redesign of mechanical elements, or rewiring, as is required with prior art equipment.

Yet another benefit of the present invention is that the same information normally used to control valve operation can be used for diagnostic purposes, both during normal valve operation (e.g., to generate a display or printout indicating the condition which caused the last open or close valve operation to be terminated) and to help evaluate system performance.

It is therefore a primary object of the present invention to provide an improved control system for motor operated valves.

Another object of the present invention is to provide a microprocessor based control and diagnostic system for motor operated valves.

Yet another object of the present invention is to provide a control system for motor operated valves which uses successive valve stem position measurements and valve load measurements to predict the valve stem position and valve stem load at a specified time in the future, and using this capability, takes the inertia of the system into account by turning off the motor when the predicted future value of either the valve stem position and/or the valve load at a exceeds the corresponding set point.

SUMMARY OF THE INVENTION

In summary, the present invention is a valve motor control system, for use with a motor operated valve. The control system provides control, predictive control and diagnostic functions.

The motor operated valve includes a valve stem for opening and closing the valve and a motor for driving the valve stem so as to controllably open and close the valve. A valve stem position sensor measures the stem position, a stem load sensor measures the load on the valve stem, and motor load sensor measures the load on the valve motor.

A microprocessor periodically tests the status of the motor operated valve, and turns off the power to the valve's motor if certain predefined criteria for the valve stem postion and the valve load are not satisfied. The periodic testing by the microprocessor includes comparing the valve stem position signal with a preselected open valve position when said valve is being opened; and comparing the valve load signal with a preselected maximum desirable stem opening load when the valve is being opened, and with a preselected maximum desirable stem closing load when the valve is being closed.

When the valve is being opened, the system predicts the position of the valve stem at a predefined time in the future and turns off the motor if the predicted valve stem position is beyond a preselected open valve position. When said valve is being closed, the system predicts the load on the valve stem at a predefined time in the future and turns off the motor if the predicted load value exceeds a preselected maximum desirable stem closing load.

Motor overload protection is provided by periodically measuring the actual load on the motor; comparing the motor load signal with a preselected maximum motor load value when said valve is being either opened or closed; and turning off the motor if the motor load comparison does not meet predefined motor load criteria.

The above described motor shut down criteria, i.e., control logic, can be modified easily by introducing changes to the system software.

Further, the control system provides diagnostic functions for analyzing the valve's performance and for aiding in the diagnosis of valve failures.

BRIEF DESCRIPTION OF THE DRAWINGS

Additional objects and features of the invention will be more readily apparent from the following detailed description and appended claims when taken in conjunction with the drawings, in which:

FIG. 1 depicts a valve motor control and diagnostic system in accordance with the invention. FIG. 1A depicts a preferred embodiment of the apparatus used for specifying system set point parameter values.

FIG. 2A is an exemplary graph representing the variation in stem thrust as a valve is opened and closed.

FIG. 3 is a graph representing the predictive control approach used in the present invention to avoid overshooting preselected set points.

FIG. 7 is a schematic diagram depicting how the control ssytem of the present invention is retrofitted onto existing motor operated valves.

DESCRIPTION OF THE PREFERRED EMBODIMENT

Figure 2:
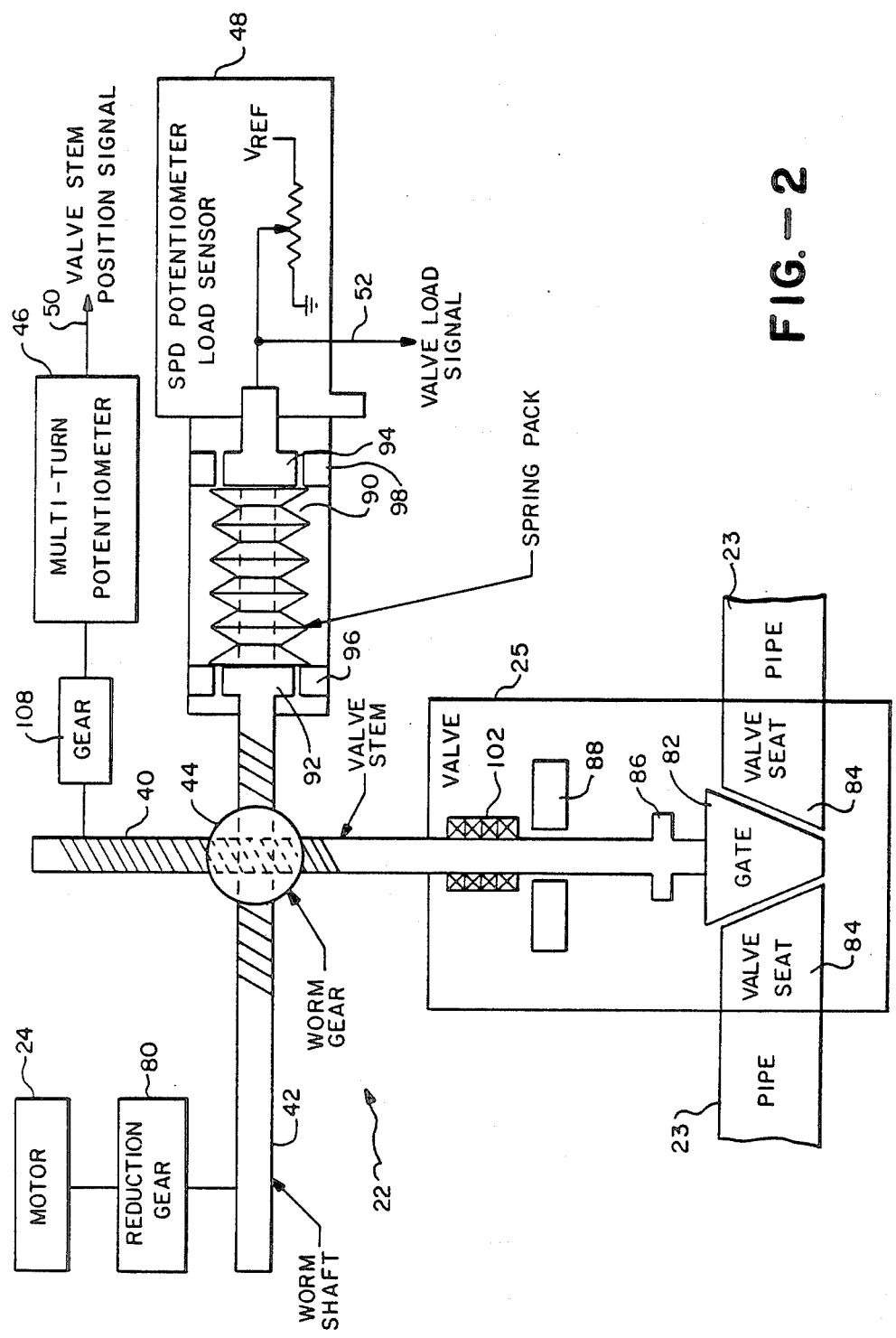
FIG. 2 is a schematic diagram of the mechanical and electromechanical components of the control system of the present invention.

Referring to FIG. 1, there is shown a control system 20 for a motor operated valve (MOV) 22 which controls the flow of fluids through a pipe 23.

The motor operated valve (MOV) 22 includes a valve 25 which is opened and closed by the movement of a valve stem 40. A bidirectional motor 24 is used to drive a worm shaft 42 which is coupled to the valve stem by a worm gear 44. The valve stem 40 moves up (i.e., away from the valve 25) or down (i.e., toward the valve 25) in accordance with the direction in which the worm shaft 42 is rotated by the motor 24.

As will be described in greater detail below, a position sensor 46 coupled to the valve stem 40 generates a position signal on line 50 which indicates the position of the valve stem 40 with respect to the valve 25. A load sensor 48 coupled to the worm shaft 42 generates a load signal on line 52 which corresponds to the load (either compressive or tensile) on the valve stem 40.

The terms valve load, valve stem load, and stem thrust are used interchangeably herein.

A motor load sensor 70 coupled to the line supplying power to the motor 24 generates a motor load signal on line 72 which is proportional to $$VI \cos\theta$$

where V is the motor voltage, I is the motor current, and $\theta$ is the phase angle between the current and voltage waveforms. The design of such motor load sensors is well known to those skilled in the art, and they are commercially available (e.g., Square D's Motor Load Detector, Type V).

The primary purpose of the control system 20 is to (1) turn on the valve's motor 24 in the appropriate direction in response to an open or close command; and (2) to turn off the motor 24 when either (a) the valve 25 is fully open or fully closed, or (b) a fault condition is detected. The control system also provides diagnostic functions described below.

In alternate embodiments of the invention, the system could be responsive to additional control commands, such as a command to open a valve half way.

Valve control switches 26 generate open and close command signals on lines 28 and 30. These switches 26 can be mechanical switches (e.g., mounted on a central control board in an electrical power plant) or can be relays controlled by a computer (not shown) or equivalent system which is controlling the use of the valve 22.

The open and close command signals on lines 28 and 30 are communicated to a programmed microprocessor 32 by means of optical isolators 34 and a digital input latch 36. The optical isolators 34 prevent transient voltages from damaging the low voltage digital circuitry in the control system 20. The digital latch 36, as will be described in more detail later, is controlled by the microprocessor 32 to periodically look for the presence of an open or close command signal when the motor 24 is off.

The motor 24 receives power through two starter coils 54 and 56. Motor starter coil 54 is used to power the motor 24 in the direction needed to open the valve 25; motor starter coil 56 is used to power the motor 24 in the direction needed to close the valve 25. As will be seen below, use of these two starters 54 and 56 is mutually exclusive.

The phrase "to turn on the valve's motor" is used herein to mean turning on either the open or close motor starter 54 or 56 and thereby turning on the power to the motor 24; similarly, the phrase "to turn off the valve's motor" is used herein to mean turning off the power to the motor by shutting off the starter 54 or 56 currently delivering power to the motor 24.

Digital control signals generated by the microprocessor 32 for turning the motor 24 on and off are first latched in a digital output latch 58 which is coupled to the motor starters 54 and 56 by optical isolators 60 and 62, respectively. As indicated earlier, optical isolators are used to prevent transient voltages from damaging the low voltage digital circuitry in the control system 20.

The digital output latch 58 is also used to latch signals used to control a display panel 74. The display 74, which is discussed in more detail below with reference to FIG. 5, has a number of labelled LEDs which are used to indicate the state of the motor operated valve 22.

Further, the digital output latch 58 is used by the microprocessor 32 to hold a three-bit channel value which determines which of the eight input signals to the ADC 64 is to be digitized and read by the microprocessor 32.

The heart of the control system 20 is the preprogrammed microprocessor 32. An EPROM (erasable programmable read only memory) is used to store the microprocessor's software. The microprocessor 32 receives information regarding the state of the motor operated valve through an analog to digital converter (ADC) 64.

In the preferred embodiment, the microprocessor 32 also receives set point information from set point means 66 through the ADC 64. Referring temporarily to FIG. 1A, the set point means 66 contains five potentiometers for specifying five parameter values: the valve stem positions for a fully open and fully closed valve, the maximum desirable valve stem load when the valve is being opened or closed, and the maximum steady state load for which the motor 24 is rated. The calibration of these potentiometers is discussed below with reference to FIG. 6. Further, as will be understood by those skilled in the art, there are a large number of alternate methods by which set point information could be supplied to the microprocessor 32, including, for example, numeric entry through a keyboard or other peripheral device attached to the microprocessor 32.

As will be described in greater detail below, the microprocessor 32 is programmed to monitor the state of the MOV 22 fifty times per second when the MOV is in operation. During each such cycle it compares the current state of the MOV 22 against certain predefined criteria to decide if the motor 24 should be turned off.

Further, the microprocessor 32 is programmed to control the lights (i.e., LEDs) on a display panel 74 so that an operator can visually monitor the state of the MOV 22.

When the MOV is not in operation, the microprocessor 32 continuously monitors the open and close command lines 28 and 30 until one or the other is energized.

A power supply 68 is used to provide a DC reference voltage Vref and a DC supply voltage Vcc for the digital circuitry in the control system 20. Vref is used as the reference voltage by the set point means 66, the position sensor 46, load sensor 48 and the motor load sensor 70.

By using the same reference voltage throughout, calibration of the control system 20 is simplified. The set point signals produced by the potentiometers 66a–66e (see FIG. 1A) in the set point means 66 are automatically scaled to the same voltage range as the measurement signals produced by the sensors 46, 48 and 70. As a result, if one measures, for instance, the voltage on the position sensor signal line 50 when the valve 25 is fully open, the open valve position potentiometer 66b in the set point means 66 is calibrated merely by adjusting the potentiometer until its output voltage is equal to the voltage on line 50.

MECHANICAL AND ELECTRO-MECHANICAL CONFIGURATION

Referring to FIG. 2, there is shown a schematic diagram of the mechanical and electromechanical components of the MOV 22 and control system 20 which are needed to generate the valve stem position signal and the valve load signal. Since the general mechanics of motor operated valves are well known to those skilled in the art, only those aspects which are directly relevant to the present invention are described herein.

Motor 24 is coupled, by means of an appropriate set of reduction gears 80, to worm shaft 42 which is coupled by a worm gear 44 to the valve stem 40 of valve 25. The motor 24 is bidirectional and can be used to rotate the worm shaft 42 about its axis in either a clockwise or counterclockwise direction.

The worm shaft 42, the worm gear 44, and the valve stem 40 are all threaded so that rotation of the worm shaft 42 by the motor 24 causes the valve stem 40 to move up or down, depending on the direction in which the worm shaft 42 is rotated.

Movement of the valve stem is measured by a multi-turn potentiometer in position sensor 46. The wiper of this potentiometer is connected by an appropriate gear mechanism 108 so that up and down movement of the valve stem causes a linearly related change in the voltage of the valve stem position signal on line 50.

Referring temporarily to FIG. 1A, the set point potentiometers 66b and 66c for specifying the valve open and close positions are multi-turn potentiometers which are identical to the potentiometer in the position sensor 46.

While the valve stem 40 is designed to move relatively freely up and down, the weight of the valve stem and gate, and various sources of friction resist the free movement of the valve stem 40. One source of friction is the packing 102 which is used to seal the valve. In addition, when the valve is fully closed, the valve gate 82 seats against valve seats 84; and when the valve is fully open, the valve's backseat 86 abuts backseat shoulder 88.

The valve load is the amount of compressive or tensile force being applied to the valve stem 40 by the motor 24. The greater the valve load, the more the valve stem 40 resists being moved by rotation of the worm shaft 42.

The worm shaft 42 tends to move laterally when the valve stem 40 resists being moved by the rotation of the worm shaft 42. However, a spring pack 90, which is rigidly mounted in the valve motor operator's housing, resists movement of the worm shaft 42. Spring seat members 96 and 98 hold the spring pack 90 in place.

Shoulder members 92 and 94 are attached to the worm shaft 42 on either side of the spring pack 90. Shoulder member 92 compresses the spring pack 90 when the worm shaft 42 moves rightward; shoulder member 94 compresses the spring pack 90 when the worm shaft 42 moves leftward.

As is well known, the amount that a spring such as the spring pack 90 will compress is generally a linear function of the force applied to the spring. Thus the amount that the spring pack 90 is compressed will be proportional to the amount of force applied thereto by the worm shaft 42.

Furthermore, the amount of force applied by the worm shaft 42 to the spring pack 90 is proportional the valve stem load. Thus, except for frictional losses, the displacement of the worm shaft from its neutral position (i.e., with the spring pack 90 not compressed) is proportional to the valve stem load.

In order to measure the worm shaft displacement (also called the spring pack displacement) a linar potentiometer is mounted on the end of the worm shaft 42 so that lateral movements of the worm shaft produce move the wiper of the potentiometer in the load sensor 48, thereby producing changes in the voltage level of the valve load signal on line 52.

Referring temporarily to FIG. 2A, there is shown a typical graph of the change in worm shaft displacement as a motor operated valve is opened and closed. As shown by curve 104, when the valve begins to close the valve load (which is proportional to the worm shaft displacement) is high. This is because of the relatively large force (generated by an actuator "hammer blow", as discussed below) which is required to unseat the valve from its backseat position. As the valve continues to close, the valve load decreases because the kinetic friction forces which resist movement of the valve stem are generally less than the static friction forces initially holding the valve in an open position. When the valve closes, the motor 24 is generally permitted to continue running for a short while so that the valve gate is firmly pushed into the gate seat 84, which causes the valve load and the worm shaft displacement to increase rapidly.

Curve 106 shows the change in valve load and worm shaft displacement when the valve is opened. This curve 106 follows the same pattern as the curve 104 for closing the valve 22, except that tensile valve stem forces are involved instead of compressive forces, and thus the worm shaft is displaced in the opposite direction.

It should be noted that when a motor operated valve 22 is opened, it is generally preferable to stop the motor 24 when valve stem reaches a specified position, whereas it is generally preferable when the valve 25 is being closed to continue running the motor after the valve stem reaches the nominal closed position until the valve stem load reaches a specified value. The difference is that to fully close a valve 25 it is best to firmly push the valve gate into the gate seat, whereas to fully open a valve 25 it is only necessary to move the valve gate out of the way and it is not necessary to firmly push the valve stem's backseat 86 into the backseat shoulder 88.

A shorthand way of restating the above rule of thumb is that valve closure is generally governed by torque priority logic while valve opening is generally governed by position priority logic. As a result, valve closure is generally accompanied by much greater valve stem loads than valve opening. Accordingly, as shown in FIG. 1A, the preferred embodiment provides separate potentiometers 66a and 66d for specifying the maximum desirable valve load while opening and closing the valve 25.

PREDICTIVE CONTROL

Referring to FIG. 3, an important feature of the present invention is the ability to avoid overshoot problems caused by the rotational inertia of the motor 24 and the reduction gears 80. In prior art devices, the motor 24 is turned off when either a specified valve stem position is reached or a specified valve stem load is reached. However, rotational inertia prevents the motor 24 from stopping instantaneously when it is turned off. Thus the valve stem 40 tends to "overshoot" the specified position and load set points.

Using the present invention, the rotational inertia of the motor 24 and reduction gears 80 is taken into account by predicting either the valve stem position and/or the valve load which will be achieved at a specified time in the future.

For instance, tests by the inventor on a particular valve showed that the inertia of the motor operated valve 22 caused the worm shaft 42 to continue turning after motor cutoff an amount equivalent to the amount it would turn in 200 to 250 milliseconds at full power. To account for the inertia of this particular motor operated valve, the control system was designed to predict the valve stem position and valve load 200 milliseconds in the future. Then, for example, while closing the valve, if the predicted valve load exceeds the specified maximum desirable valve load the motor 24 is immediately turned off. Empirical testing showed that not only did the valve consistently fully close, but also that overshoot problems were largely eliminated. The full use of predicted position and load in the preferred embodiment are explained below with reference to FIG. 4.

The principal of anticipatory or predictive control is illustrated in FIG. 3. The goal is to predict the value of a control variable CV at a specified time in the future. Also, it is assumed that at the "present" time the control variable being monitored has not exceeded its set point.

Curve 112 represents the value of the control variable CV as a function of time if the driving force for the control variable (i.e., motor 24) is removed when the control variable CV reaches its set point 114. As shown, due to system inertia, the control variable CV reaches a value represented by point 116 which far exceeds the CV set point 114.

Using the most straightforward approach, an approximation of the first derivative of the control variable CV with respect to time is calculated by subtracting the last measured value of the control value from the "present" value, and dividing by the sample interval dt:

$$\text{rate of rise} = (CV_{present} - CV_{last})/dt. \qquad \text{(Eq. 1)}$$

In this manner, an instantaneous rate of rise of the control variable (e.g., stem thrust) is derived. This rate of rise is represented by dashed line 118. Assuming that the driving force for the control variable were removed at the "present" time, the future value of the control variable, say n sampling intervals past the present time, could be approximated by the expression:

$$CV_{future} = CV_{present} + (CV_{present} - CV_{last})*n. \qquad \text{(Eq. 2)}$$

The actual value of the control variable CV after n time intervals will be somewhat less than calculated above because frictional forces will eventually bring system dynamics to a halt. See for example curve 120. Used properly, however, an appropriate value of n in equation Eq. 2 will approximate the steady state value of that the control variable CV will achieve if the driving force for the control variable were removed at the "present" time.

In the preferred embodiment of the invention, each sampling interval dt lasts 20 milliseconds. For certain large motor operated valves the best value of n was found to be ten, corresponding to a prediction time of 200 milliseconds.

As will be understood by those skilled in the art, considerably more sophisticated predictive control calculations could be performed by deriving a more accurate model of the change in the control variable CV after the driving force for the control variable is removed. For instance, the rate of change of the control variable function could be assumed to decelerate at a specified rate which is derived by empirical testing. However, it has been found by the inventor that the first order approach depicted in FIG. 3 works quite well in the context of motor operated valves, yielding significant performance improvements over the prior art.

In the preferred embodiment, the above described predictive approach is applied, when the valve is being closed, to the valve stem thrust; and when the valve is being opened, to both the valve stem position and to the valve stem thrust.

In alternate embodiments of the invention, however, it may be useful to use motor load as a predictive control variable. Another potential predictive control variable would be a mixed function of the stem thrust, valve stem position and/or the motor load. Generally, the predictive approach explained below can be applied to any control variable which can be uesd to reliably predict the effect of rotational inertia on fully opening and closing the valve 25 after motor cutoff.

CONTROL ALGORITHM

Before discussing the preferred control algorithm for the valve motor control system of the invention, three phenomena accounted for in the algorithm need to be explained: inrush current, motor overload, and the hammer blow associated with the unseating of a valve gate.

When an open or close command is received and the motor 24 is first turned on, the motor 24 tends to draw significantly more current than during normal steady state operation. This inrush current typically lasts less than 200 milliseconds, although the exact amount of time will vary from motor to motor. To avoid erroneous motor overload fault detection caused by inrush current, monitoring for motor overload is suspended during a period of predefined length (200 milliseconds in the preferred embodiment) beginning when the motor is first turned on.

Another phenomenon that occurs when an open or close command is first received is that an actuator hammer blow is needed to unseat the valve gate. Actuator hammer blows result from free motion in the actuator (i.e., motor and reduction gear) drive mechanism when the actuator is started, which results in an impact on the heavy lugs on the worm gear as the drive motor reaches its rated rotational velocity.

This hammer blow will generally result in a stem thrust which does not exceed the maximum stem thrust set point. Therefore, such hammer blows usually do not represent a threat to the integrity of the valve 25 and do not warrant shutdown of the motor 24.

Actuator hammer blows are generally characterized by a sharp, short rise in the stem thrust. See, for example, FIG. 2A. To distinguish hammer blows from real stem thrust conditions warranting motor shutdown, the predictive control portion of the control algorithm of the preferred embodiment ignores stem thrust transients of less than 40 milliseconds duration (i.e., which last less than two sample periods, each of which are 20 milliseconds long). In particular, the control algorithm is designed to require that the predicted stem thrust exceed the set point level for two consecutive sample time periods. The result of this requirement is that the system ignores the rapid changes in the slope of the stem thrust signal which are characteristic of hammer blows.

Motor overload is best tested using a multi-level test because a mild overload (e.g., 200% of the motor's normal steady state current) can be tolerated for much longer (e.g., 1 minute) than a locked rotor condition which typically draws 600% of motor's normal maximum current and can typically be allowed to persist for only a few seconds, at most, before serious damage to the motor will occur. Therefore in the preferred embodiment a two level motor overload test is provided: (1) simple motor overload (i.e., where measured motor load exceeds the motor load set point) is allowed to persist for a predetermined time period (e.g., 5 seconds) before a warning signal is generated; (2) but a motor overload of over 600% of the motor load set point is allowed to persist for only a second predetermined time period (e.g., 100 milliseconds) before the motor is shut off.

The above mentioned warning signal can be any signal, including an audible alarm, which is designed to bring to the attention of the persons supervising the operation of the system that the valve motor needs inspection.

As will be understood by those skilled in the art, a number of other motor overload detection and response algorithms could be used in alternate embodiments of the invention. The method used will depend both on the characteristics of the motor used and on a variety of external factors, including the availability of maintenance personnel and the relative cost of valve and motor degradation caused by running at low overload levels compared with the cost of system shut down.

Figure 4:
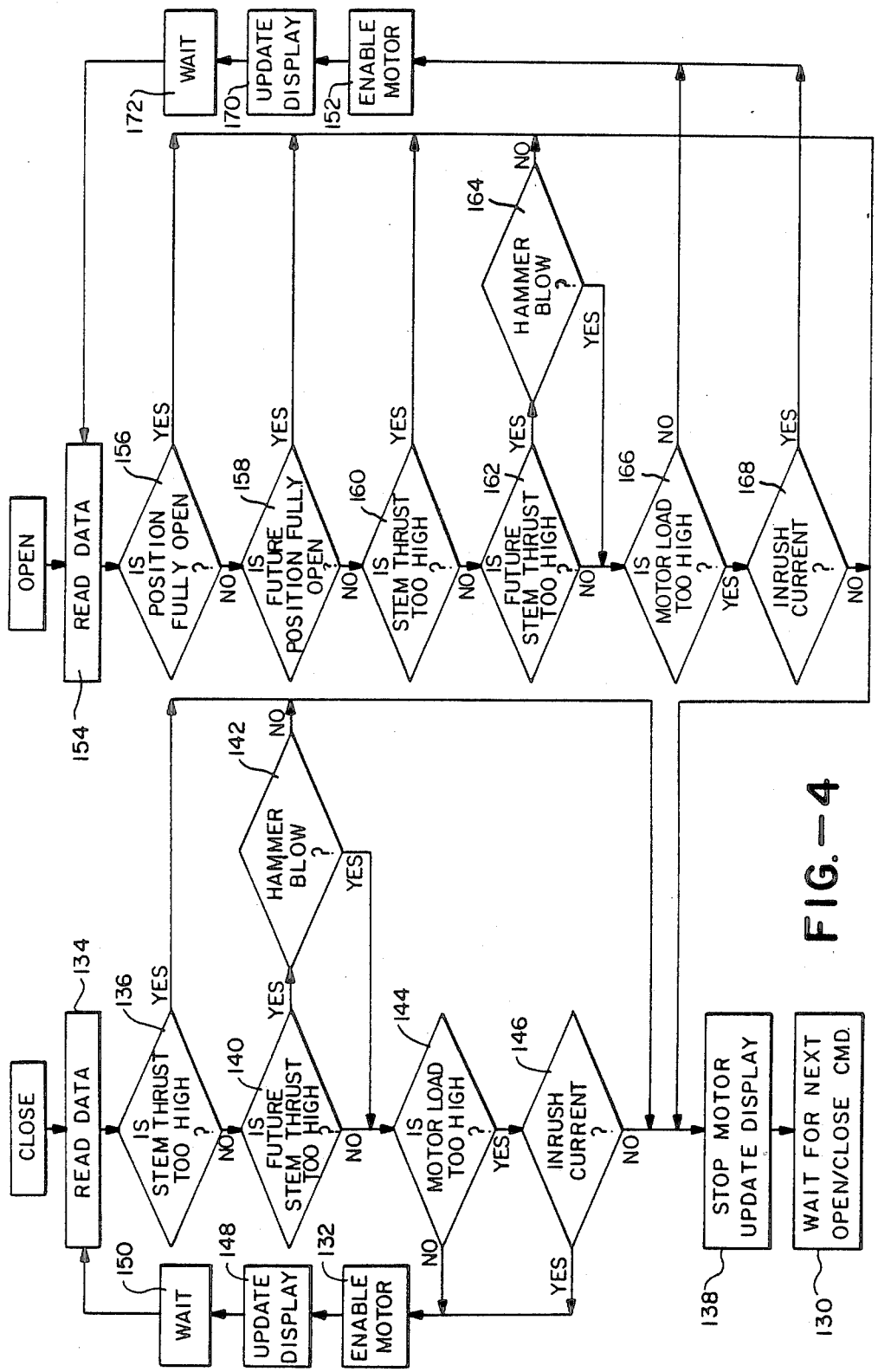
FIG. 4 depicts a flow chart for a valve motor operator control algorithm.

Referring to FIG. 4, while the valve motor is inactive, the microprocessor 32 continuously monitors the open and close command lines 28 and 30 (see FIG. 1) until the next open or close command is received (box 130).

After a close valve command is received, the process of closing the valve is begun by causing the microprocessor to read in all the set point values and the valve stem position, the stem thrust, and the motor load (box 134).

Since the algorithm for closing an MOV is usually governed by stem thrust priority (although in other embodiments of the invention it could be governed by position priority if desired), the first test (box 136) is to determine if the measured stem thrust exceeds the set point for the maximum desirable valve load when the valve is being closed. If so, the motor is disabled and the display is updated (box 138). The process of updating the display will be described below with reference to FIG. 5.

Note that if the valve is already closed when a close valve command is received, the residual stem thrust will generally exceed the stem thrust set point and the control process will immediately proceed to box 138 without the motor ever being started.

The second test (box 140) is to determine if the predicted future stem thrust exceeds the stem thrust set point, but allowing for fast transients which are identified as hammer blows (box 142), as discussed above.

As noted briefly above, in the preferred embodiment, using certain large motor operated valves which are typical of those used in electrical power plants, a sampling cycle time of 20 milliseconds (i.e., dt=20 milliseconds in equation (Eq. 1) is used. This means that the status of the valve is monitored and tested once each 20 milliseconds (i.e., 50 times per second). For predictive purposes, a value of n=10 is used in equation Eq. 2, corresponding to predicting the value of the control variables 200 milliseconds in the future.

If the predicted stem thrust is too high (box 140), and this is not due to a hammer blow (box 142), the motor is stopped (box 138).

The final test (box 144) is the two level motor load test described above, with allowance for an initial inrush current (box 146).

If no fault conditions are detected, the motor is enabled (box 132) and the display is updated (box 148), as will be described below with reference to FIG. 5. Subsequent passes through the control sequence will allow continued motor operation until a set point is reached or predicted.

Since the monitoring and testing process (boxes 134 through 148) for one sampling period takes only approximately 1.7 milliseconds in the preferred embodiment, the system idles (box 150) for the remaining 18.3 milliseconds of each 20 millisecond sampling cycle.

After the motor 24 is turned off (box 138) the microprocessor waits for the next open or close command (box 130).

Since the control algorithm for opening a valve is similar in many respects to the control algorithm described above for closing a valve, only the differences in the two algorithms will be described.

After an open valve command is received, the process of opening the valve is begun by causing the microprocessor to read in all the set point values and the valve stem position, the stem thrust, and the motor load (box 154).

Since the algorithm for opening an MOV is usually governed by position priority (although in other embodiments of the invention it could be governed by thrust priority if desired), the first test (box 156) is to determine if the measured valve stem position corresponds to a fully open valve. Restated, the system tests whether the measured valve stem position is less than or equal to the set point for a fully open valve. If so, the motor is disabled (box 138).

Note that if the valve is already open when an open valve command is received, the stem position will generally correspond to a fully open valve and the control process will immediately proceed to box 138 without the motor ever being started.

The second test (box 158) is to determine if the predicted future valve stem position corresponds to a fully open valve. The predicted value is the value 200 milliseconds in the future, using the prediction method described above with reference to FIG. 3. This second test helps eliminate or reduce potential damage to the valve caused by backseating.

The third through fifth tests (boxes 160 through 168) correspond to the three tests (boxes 136 through 146) of the close valve algorithm described above. The only difference is that the set point for the maximum desirable stem thrust while opening the valve is used instead of the stem thrust set point for closing the valve.

If no faults are detected, the motor is enabled (box 152), the display is updated (box 170) and then the system idles (box 172) until the beginning of the next 20 millisecond sampling period.

As will be clear to those skilled in the art, in alternate embodiments of the invention, many modifications could be made to the control algorithm to fit the particular circumstances in which the invention is being used. For instance, somewhat different tests could be used, including tests for additional or different fault conditions; a different testing order could be used; and/or the sample cycle time could be decreased to allow for quicker detection of certain fault conditions.

DISPLAY AND SET POINT PANEL

Figure 5:
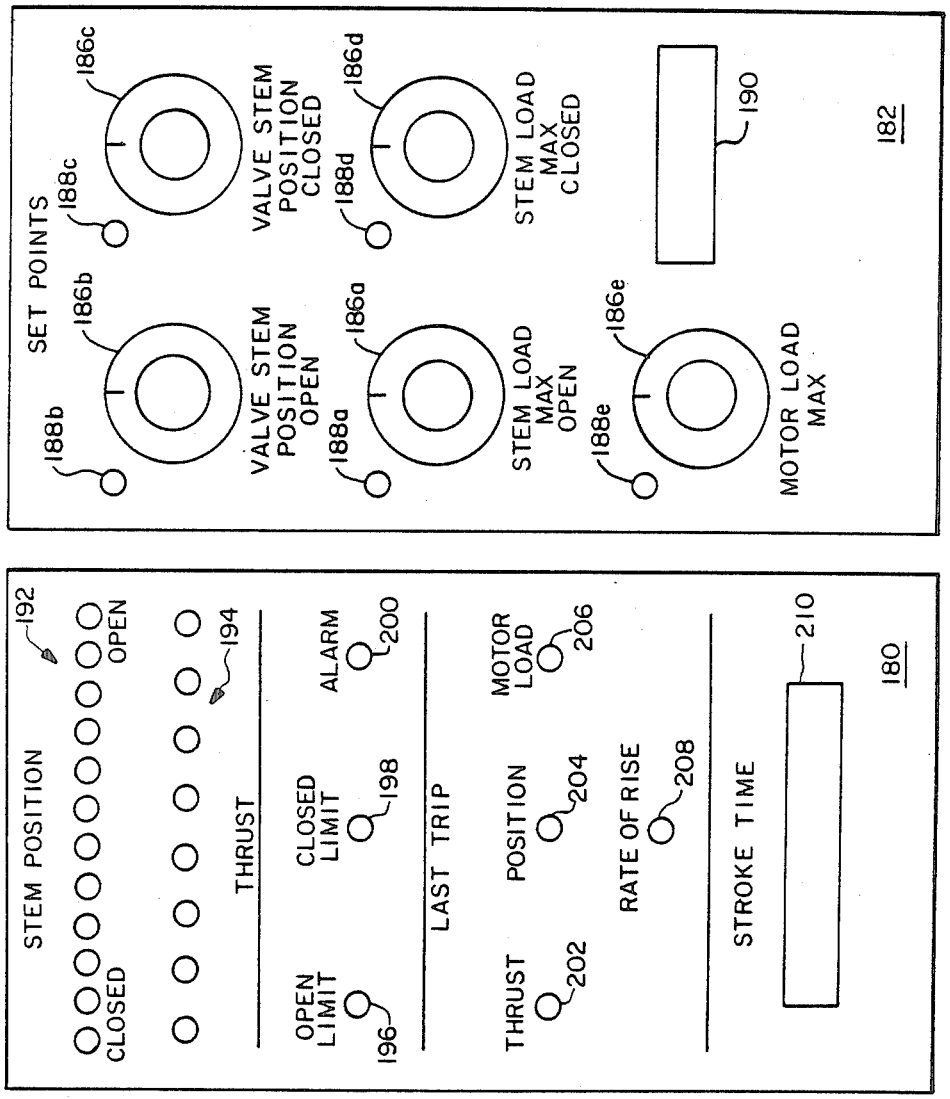
FIG. 5 depicts the display and set point control panel used in the preferred embodiment of the invention.

Referring to FIG. 5, there is shown a schematic representation of the display and set point panel of the preferred embodiment. In the preferred embodiment, the set point panel 182 is physically located behind the display panel 180 to reduce the chance of the set points being inadvertently changed.

The set point panel contains five dials 186a-186e for setting the wiper position of the five set point potentiometers 66a-66e shown in FIG. 1A.

A button 188a-188e next to each dial is used to connect a digital voltmeter (not shown) behind the panel 182 to the corresponding potentiometer so that the setting of the corresponding potentiometer can be seen on the five digit display 190 of the digital voltmeter.

The display panel 180 has four sections. The top section is used to continuously display the current position of the valve stem and the current value of the stem thrust.

The current stem position is representing by energizing one of twelve LEDs 192. This enables the operator to see, for instance, if the valve stem has stopped in mid-stroke.

The current value of the stem thrust is represented by energizing a number of LEDs 194 which is proportional to the measured stem thrust. Compressive stem thrust is represented by energizing LEDs starting on the left side of the line of LEDs 194, while tensile stem thrust is represented by energizing LEDs starting on the right side.

Referring again to FIG. 4, both the stem positiom and stem thrust displays are updated once each sampling cycle at box 148 or 170. The remaining portions of the display panel are updated each time the motor is stopped (box 138).

The Open Limit LED 196 is energized if the valve stem position indicates that the valve is fully open. The Closed Limit LED 198 is energized if the valve stem position indicates that the valve is fully closed.

The Alarm LED 200 is energized if any of the following fault conditions occurs: the valve is neither fully open nor fully closed after the motor is turned off; a motor overload condition was detected; or the stroke time (i.e., the time it took to open or close the valve) exceeds a predefined time limit. In the preferred embodiment, when the Alarm LED 200 is energized the system also generates an audible alarm (using a speaker not shown in the Figures).

At the end of each sample period, one of the Thrust, Position and Motor Load LEDs 202, 204 or 206 is energized, in accordance with the test condition that caused the motor to be shut off. Also, the Rate of Rise LED 208 is energized if the motor was shut off in response to a predictive control test. In an alternate embodiment of the invention, an alarm or warning message could be generated whenever the motor is shut in response to any of the non-predictive control tests.

Finally, the length of time from when a open or close valve command was received to the time when the motor was shut off is displayed on a digital display 210 labelled Stroke Time. In the preferred embodiment, the microprocessor 32 is coupled to a standard clock chip (not shown in the Figures) for the purpose of making these time measurements.

As will be understood by those skilled in the art, the diagnostic functions provided in the preferred embodiment represent only a small subset of the diagnostic functions which could be provided in alternate embodiments. For example, using the measurement information available to the system the control system could compare the valve's performance against a variety of performance criteria. Further, the microprocessor 32 could be connected via a modem or equivalent device to a central computer and could be programmed to send valve performance data to that central computer for trend analysis, documentation of valve condition, valve failure analysis, and for analysis aimed at predicting the need for preventative maintenance procedures.

CONTROL SYSTEM CALIBRATION

As indicated above, the use of potentiometers as set point selectors allows the selection of set point voltage values which are equal to the maximum (or minimum, in one instance) voltage values to be measured by the position, stem thrust and motor load sensors.

The calibration of the valve stem potentiometers is quite simple. Referring to FIG. 1, the voltage on the position sensor signal line 50 is measured when the valve 25 is fully open, and when the valve is fully closed. Then the corresponding potentiometers in the set point means 66 (see FIG. 1A) are calibrated merely by adjusting the potentiometers until the output voltage of each is equal to the voltage that was measured on line 50 when the valve was fully open and fully closed.

The calibration of the motor load potentiometer can be done as follows. Using the system's motor load detector, the steady state motor load signal during normal motor operation is measured and the motor load potentiometer is set a value equal to the measured motor load signal. This calibration method is preferred for its simplicity. Also, it enables the generation of warnings when the motor exceeds normal operating level by a specified margin (e.g., 100 percent), a test which is often more sensitive and more meaningful than determining when the motor load exceeds the manufacturer's maximum load specifications.

An alternate calibration method, keyed to the manufacturer's maximum load specifications is as follows. Using an AC ammeter, the current drawn by the motor is measured during a test run; and the voltage of the motor load signal on line 72 is also measured. Then the motor load potentiometer is set to a value equal to the measured motor load signal voltage multiplied by whatever factor would be required to increase the measured motor current to the motor's maximum rated steady state current.

Figure 6:
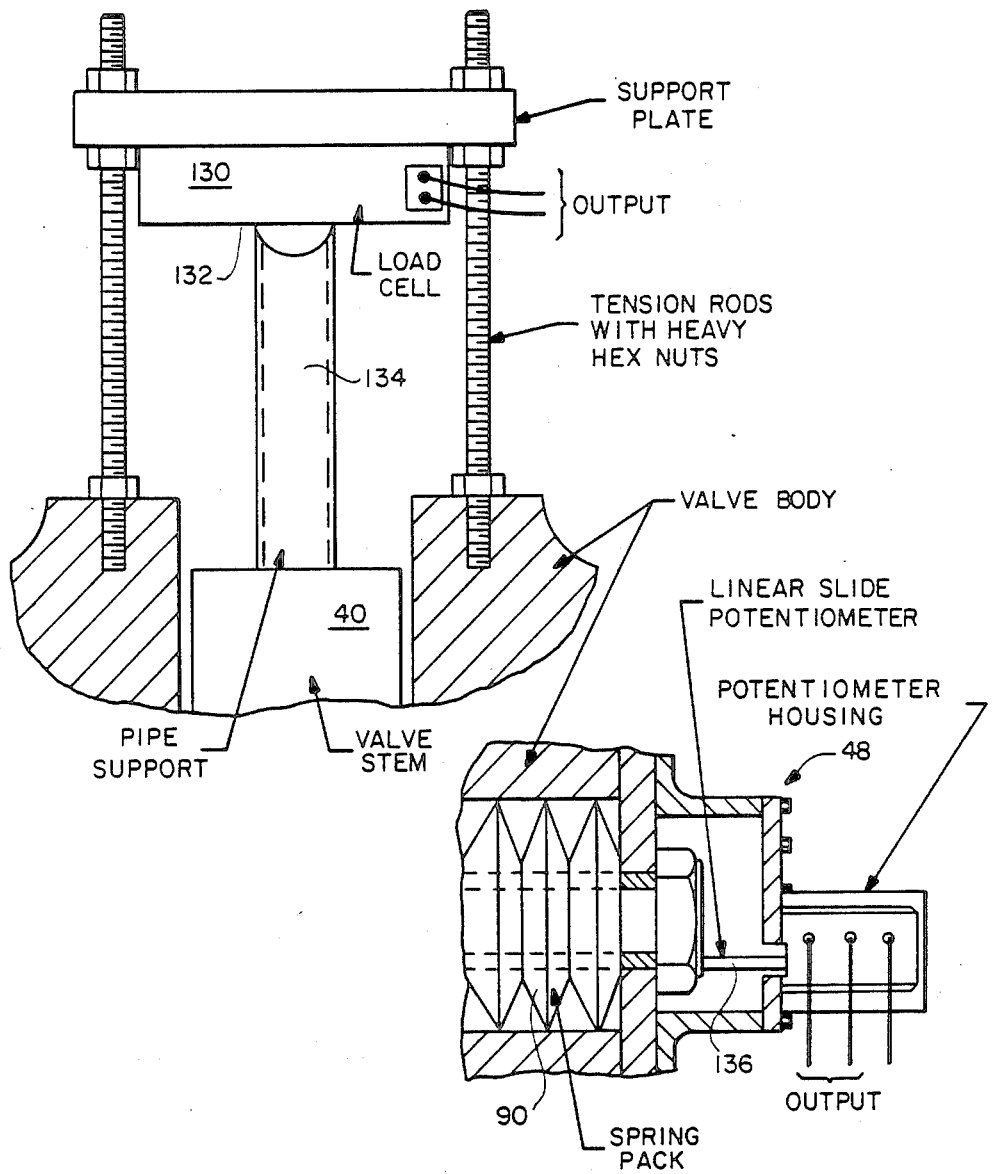
FIG. 6 is a schematic diagram depicting one portion of the process of calibrating the control system of the present invention.

Referring to FIG. 6, there is shown a schematic diagram depicting the process of calibrating the stem thrust set point potentiometers of the control system 20. A laboratory load cell 130 is temporarily mounted on the valve body as shown in FIG. 6. A length of bar stock 134 provides physical contact between the top of the valve stem 40 and the loading sensing surface 132 of the load cell 130.

The motor is activated so as to withdraw the valve stem 40 from the valve, thereby pressing the bar 134 into the load cell 130. As the load cell rises, both the output voltage of the linear slide potentiometer 136 in the load sensor 48 and the stem thrust as measured by the load cell 130 are recorded. From these measurements, the correlation between load sensor output and actual force in the valve stem is derived. The correlation will generally take the form of $$\text{load sensor voltage} = k1 + (k2 * \text{stem thrust}) \qquad \text{(Eq. 3)}$$

where k1 and k2 are constants derived by plotting the data recorded and finding the best line which fits the data.

Then, using equation Eq. 3 and the valve manufacturer's specifications for the maximum desirable compressive and tensile stem thrust, the two stem thrust potentiometers are set to their corresponding values.

RETROFITTING EXISTING MOTOR OPERATED VALVES

Referring to FIG. 7, there is shown a schematic diagram depicting how the control system of the present invention is retrofitted onto existing motor operated valves.

First, the limit and torque switches 150, 152, 154 formerly used to turn the valve motor 24 off are by-passed by short circuit lines 156 and 158.

The open and closing latching contacts 160 and 162, which are standard momentary switches commonly used with MOVs can be left unchanged. Similarly, the interposing contacts 164 and 166, which are used to prevent the valve open starter from being activated when the valve close starter is already energized, and vice versa, should be left unchanged.

Then open and close power triacs 168 and 170 are connected to the valve open and valve close starters 54 and 56 (see FIG. 1). Control signals, conveyed from the microprocessor 32 via optical isolators 60 and 62, are used to turn the valve motor 24 off and on by controlling the voltage on the gates of the two triacs 168 and 170.

Finally, the 115 VAC supply voltage used to power the motor starter coils is connected to an AC to DC converter to supply DC power (Vcc) and a DC reference voltage Vref for use by the control system 20.

While the present invention has been described with reference to a few specific embodiments, the description is illustrative of the invention and is not be construed as limiting the invention. Various modifications may occur to those skilled in the art without departing from the true spirit and scope of the invention as defined by the appended claims.

What is claimed is:

1. A valve motor control system, fur use with a motor operated valve including a valve stem for opening and closing said valve and motor means for driving said valve stem so as to controllably open and close said valve, said valve motor control system comprising:

position means for measuring the position of said valve stem and producing a valve stem position signal;

load means for measuring the load on said valve stem and producing a valve stem load signal;

monitor means coupled to said motor means, position means and load means, for controlling the operation of said motor, including a digital computer programmed to:

periodically compare said valve stem position signal with a preselected open valve position when said valve is being opened;

periodically compare said valve stem load signal with a preselected maximum desirable stem opening load when said valve is being opened, and with a preselected maximum desirable stem closing load when said valve is being closed;

turn off said motor when said valve stem position comparison does not meet predefined valve stem position criteria, or when said valve stem load comparison does not meet predefined valve stem load criteria;

periodically, when said valve is being opened, predict the position of said valve stem at a predefined time in the future; and turn off said motor if said predicted valve stem position is beyond said preselected open valve position.

2. The valve motor control system of claim 1, wherein said digital computer is further programmed to:

periodically, when said valve is being closed, predict the load on said valve stem at a predefined time in the future and compare the resulting predicted valve stem load with said preselected maximum desirable stem closing load; and turn off said motor if said predicted valve stem load does not meet predefined future valve stem load criteria.

3. The valve motor control system of claim 2, wherein said digital computer is further programmed to:

periodically, when said valve is being opened, predict the load on said valve stem at a predefined time in the future; and turn off said motor if said predicted valve stem load is beyond said preselected maximum desirable stem opening load.

4. The valve motor control system of claim 3, further including motor load measuring means for measuring the load on said motor and producing a motor load signal;

wherein said digital computer is further programmed to:

periodically compare said motor load signal with a preselected maximum motor load valve when said valve is being either opened or closed; and turn off said motor if said motor load comparison does not meet predefined motor load criteria.

5. The valve motor control system of claim 4, wherein said motor load criteria include:

allowance for a current inrush period beginning when said motor begins to open or close said valve, during which said motor load may not be used as a basis for turning off said motor; and distinct time allowance criteria for turning off said motor in response to at least two distinct motor load signal values which exceed said preselected maximum motor load value.

6. The valve motor control system of claim 5, wherein said motor means includes a worm shaft and gear means for imparting power to said valve stem, said worm shaft including spring pack means for resisting displacement of said worm shaft; and said load measuring means includes means for measuring the displacement of said spring pack means from its resting position and for producing a valve stem load signal proportional to said displacement of said spring pack means.

7. The valve motor control system of claim 5, wherein said predicted valve stem load criteria include:

allowance for a temporary large valve stem load when said valve stem is first unseated when said valve is being opened or closed; and otherwise, determining that said motor should be shut off when said predicted valve stem load exceeds said predefined maximum desirable stem opening load when said valve is being opened, or exceeds said preselected maximum desirable stem closing load when said valve is being closed.

8. The valve motor control system of claim 1, including set point means for specifying said preselected open valve position, said preselected closed valve position, said preselected maximum desirable stem opening load, and said preselected maximum desirable stem closing load.

9. The valve motor control system of claim 1, wherein said control system further includes display means, coupled to said digital computer, for annunciating diagnostic information; and said digital computer is further programmed to:

analyze the performance of said valve in accordance with predefined diagnostic criteria; and display on said display means diagnostic information corresponding to the results of said valve performance analysis.

10. A method of controlling a motor operated valve having a valve stem for opening and closing said valve, and motor means for driving said valve stem so as to controllably open and close said valve; the steps of the method comprising:

measuring the position of said valve stem and producing a valve stem position signal;

measuring the load on said valve stem and producing a valve stem load signal;

periodically comparing said valve stem position signal with a preselected open valve position when said valve is being opened;

periodically comparing said valve stem load signal with a preselected maximum desirable stem opening load when said valve is being opened, and with a preselected maximum desirable stem closing load when said valve is being closed;

turning off said motor when said valve stem position comparison does not meet predefined valve stem position criteria, or when said valve stem load comparison does not meet predefined valve stem load criteria;

periodically, when said valve is being opened, predicting the position of said valve stem at a predefined time in the future; and turning off said motor if said predicted valve stem position is beyond said preselected open valve position.

11. The method of claim 10, further including the steps of:
- periodically, when said valve is being closed, predicting the load on said valve stem at a predefined time in the future and comparing the resulting predicted valve stem load with said preselected maximum desirable stem closing load; and
- turning off said motor if said predicted valve stem load does not meet predefined future valve stem load criteria.

12. The method of claim 11, further including the steps of:
- periodically, when said valve is being opened, predicting the load on said valve stem at a predefined time in the future; and
- turning off said motor if said predicted valve stem load is beyond said preselected maximum desirable stem opening load.

13. The method of claim 12, further including the steps of:
- providing display means for annunciating diagnostic information;
- analyzing the performance of said valve in accordance with predefined diagnostic critieria; and
- displaying on said display means diagnostic information corresponding to the resuls of said valve performance analysis.

14. A motor operated valve comprising:
- a valve, including a valve stem for opening and closing said valve;
- motor means for driving said valve stem so as to controllably open and close said valve; and
- a valve motor control system including:
- position means for measuring the position of said valve stem and producing a valve stem position signal;
- load means for measuring the load on said valve stem and producing a valve stem load signal;
- monitor means coupled to said motor means, position means and load means, for controlling the operation of said motor, including a digital computer programmed to:
- periodically compare said valve stem position signal with a preselected open valve position when said valve is being opened;
- periodically compare said valve stem load signal with a preselected maximum desirable stem opening load when said valve is being opened, and with a preselected maximum desirable stem closing load when said valve is being closed;
- turn off said motor when said valve stem position comparison does not meet predefined valve stem position criteria, or when said valve stem load comparison does not meet predefined valve stem load criteria;
- periodically, when said valve is being opened, predict the position of said valve stem at a predefined time in the future; and
- turn off said motor if said predicted valve stem position is beyond said preselected open valve position.

15. The motor operated valve of claim 14, wherein said digital computer is further programmed to:
- periodically, when said valve is being closed, predict the load on said valve stem at a predefined time in the future and compare the resulting predicted valve stem load with said preselected maximum desirable stem closing load; and
- turn off said motor if said predicted valve stem load does not meet predefined future valve stem load criteria.

16. The motor operated valve of claim 15, wherein
- said control system further includes display means, coupled to said digital computer, for annunciating diagnostic information; and
- said digital computer is further programmed to:
- analyze the performance of said valve in accordance with predefined diagnostic criteria; and
- display on said display means diagnostic information corresponding to the results of said valve performance analysis.

17. A valve motor control system, for use with a motor operated valve including a valve stem for opening and closing said valve and motor means for driving said valve stem so as to controllably open and close said valve, said valve motor control system comprising:
- position means for measuring the position of said valve stem and producing a valve stem position signal;
- load means for measuring the load on said valve stem and producing a valve stem load signal;
- monitor means coupled to said motor means, position means and load means, for controlling the operation of said motor, including a digital computer programmed to:
- periodically, when said valve is being opened, determine the rate of change of the position of said valve stem, and predict the position of said valve stem at a predefined time in the future in accordance with said rate of change of valve stem position; and
- turn off said motor if said predicted valve stem position is beyond a preselected open valve position.

18. The valve motor control system of claim 17, wherein said digital computer is further programmed to:
- periodically, when said valve is being closed, determine the rate of change of the load on said valve stem, predict the load on said valve stem at a predefined time in the future in accordance with said rate of change of valve stem load, and compare the resulting predicted valve stem load with a preselected maximum valve stem closing load; and
- turn off said motor if said predicted valve stem load exceeds said preselected maximum valve stem closing load.

19. The valve motor control system of claim 18, wherein said digital computer is further programmed to:
- periodically, when said valve is being opened, determine the rate of change of the load on said valve stem, predict the load on said valve stem at a predefined time in the future in accordance with said rate of change of valve stem load, and compare the resulting predicted valve stem load with a preselected maximum valve stem opening load; and
- turn off said motor if said predicted valve stem load exceeds said preselected maximum valve stem opening load.

20. A method of controlling a motor operated valve having a valve stem for opening and closing said valve, and motor means for driving said valve stem so as to controllably open and close said valve; the steps of the method comprising:
- measuring the position of said valve stem and producing a valve stem position signal;

measuring the load on said valve stem and producing a valve stem load signal;

periodically, when said valve is being opened, determining the rate of change of the position of said valve stem, and predicting the position of said valve stem at a predefined time in the future in accordance with said rate of change of valve stem position; and turning off said motor if said predicted valve stem position is beyond a preselected open valve position.

21. The method of claim 20, further including the steps of:

periodically, when said valve is being closed, determining the rate of change of the load on said valve stem, predicting the load on said valve stem at a predefined time in the future in accordance with said rate of change of valve stem load, and comparing the resulting predicted valve stem load with a preselected maximum valve stem closing load; and turning off said motor if said predicted valve stem load exceeds said preselected maximum valve stem closing load.

22. The method of claim 20, further including the steps of:

periodically, when said valve is being opened, determining the rate of change of the load on said valve stem, predicting the load on said valve stem at a predefined time in the future in accordance with said rate of change of valve stem load, and comparing the resulting predicted valve stem load with a preselected maximum valve stem opening load; and turning off said motor is said predicted valve stem load exceeds said preselected maximum valve stem opening load.

* * * * *